(12) United States Patent
Sandbulte et al.

(10) Patent No.: US 9,358,854 B1
(45) Date of Patent: Jun. 7, 2016

(54) AIR SUSPENSION CONTROL SYSTEM FOR A VEHICLE

(71) Applicants: Arlin G. Sandbulte, Sioux Center, IA (US); Tye B. Davis, Alton, IA (US); W. Charles Boden, Maurice, IA (US)

(72) Inventors: Arlin G. Sandbulte, Sioux Center, IA (US); Tye B. Davis, Alton, IA (US); W. Charles Boden, Maurice, IA (US)

(73) Assignee: LINK, MFG., LTD., Sioux Center, IA (US)

( * ) Notice: Subject to any disclaimer, the term of this patent is extended or adjusted under 35 U.S.C. 154(b) by 0 days.

(21) Appl. No.: 14/741,610

(22) Filed: Jun. 17, 2015

(51) Int. Cl.
*B60G 17/017* (2006.01)
*B60G 17/015* (2006.01)
*B60G 17/019* (2006.01)

(52) U.S. Cl.
CPC ............ *B60G 17/017* (2013.01); *B60G 17/019* (2013.01); *B60G 17/0155* (2013.01)

(58) Field of Classification Search
CPC . B60G 17/017; B60G 17/0155; B60G 17/019
See application file for complete search history.

(56) References Cited

U.S. PATENT DOCUMENTS

| | | | | |
|---|---|---|---|---|
| 5,452,919 | A * | 9/1995 | Hoyle ................. | B60G 17/0155 280/5.505 |
| 6,502,837 | B1 * | 1/2003 | Hamilton ............ | B60G 17/0152 280/5.515 |
| 8,413,997 | B1 | 4/2013 | Coombs et al. | |
| 2001/0007419 | A1 * | 7/2001 | Tanaka .................. | H02J 7/0065 323/285 |
| 2003/0193149 | A1 * | 10/2003 | Russell .............. | B60G 17/0525 280/6.152 |
| 2008/0184623 | A1 * | 8/2008 | Heigl ...................... | E05F 15/73 49/31 |
| 2010/0283581 | A1 * | 11/2010 | Heigl ...................... | E05F 15/77 340/5.72 |
| 2011/0035104 | A1 * | 2/2011 | Smith .................. | B60G 17/017 701/37 |
| 2015/0137463 | A1 * | 5/2015 | McLennan ........... | B60G 17/016 280/6.153 |

* cited by examiner

*Primary Examiner* — Drew Brown
(74) *Attorney, Agent, or Firm* — Dennis L. Thomte; Thomte Patent Law Office LLC

(57) ABSTRACT

An air suspension control system for a vehicle such as an ambulance, a bus or a semi-truck. The control system includes an air supply, such as a compressor, which is configured to pneumatically communicate with a lift mechanism for moving the lift mechanism between a ride height position and a kneeling position and vice versa. The controller is configured to return or recover the lift mechanism to its ride height position during the time the lift mechanism is moving from its ride height position to its kneeling position by only deactivating the kneel input. The controller is configured to return or recover the lift mechanism to its ride height position after the lift mechanism has reached kneeling position by both deactivating the kneel input and activating the recover trigger input by pressing the brake pedal. The control system also has a transmission park feature and an ignition timer feature.

6 Claims, 4 Drawing Sheets

AIR SUSPENSION CONTROL SYSTEM FOR A VEHICLE

BACKGROUND OF THE INVENTION

1. Field of the Invention

This invention relates to an air suspension control system for a vehicle such as an ambulance, bus, semi-truck, rescue vehicle, pick-up truck or automobile. More particularly, this invention relates to an air suspension control system which includes a lift mechanism which may be used to maintain the vehicle at a ride height position and to cause the lift mechanism to be moved to a kneeling position. Even more particularly, this invention relates to a system whereby the kneeling process may be halted at any time before the kneeling process is completed through the use of a single switch.

2. Description of the Related Art

Conventional air suspension systems have long been on vehicles such as automobiles, trucks, buses, and emergency vehicles such as ambulances. The prior art air suspension systems normally utilize air springs which are positioned between the vehicle axles and the vehicle chassis. The prior art air suspension systems are also adapted to control the height of the vehicle when the vehicle is carrying loads of various weights. Further, the air suspension systems of the prior art are capable of leveling the vehicle when the vehicle is resting on uneven surfaces.

The prior art air suspensions are also utilized on public buses and emergency vehicles, with the air suspension systems thereof being capable of lowering portions of the vehicle, usually the rear end thereof or one side thereof for selected periods of time which is normally referred to "kneeling". For example, the passenger entrance/exit side of a public bus may be lowered or kneeled to lower that side of the bus to enable persons to more easily enter the bus or exit the bus.

In emergency vehicles, such as ambulances, the rear end of the emergency vehicle is lowered or kneeled to enable a stretcher or the like to be more easily placed within the ambulance and to be removed therefrom. U.S. Pat. No. 8,413,997 issued on Apr. 9, 2013 which solved many of the problems associated with the kneeling of vehicles. However, the system of U.S. Pat. No. 8,413,997 has certain shortcomings or drawbacks as will now be described.

In the system of U.S. Pat. No. 8,413,997, when the suspension system is in the kneeling process and has not reached its kneel height setting, the suspension system cannot recover or return to its ride height unless the two kneel input signals are activated which usually involves the closure of the rear door(s) of the ambulance and the depression of the brake pedal in the cab of the ambulance thereby causing the suspension to recover to the design height setting. This means that once the suspension system of U.S. Pat. No. 8,413,997 starts kneeling, it will always go all the way down, unless a person is quick enough to both close the rear door and press the brake pedal before it finishes kneeling. This shortcoming is critical should someone be underneath the vehicle during maintenance or repair work.

Further, the suspension system of U.S. Pat. No. 8,413,997 may be activated into its kneeling mode if the transmission of the vehicle is not in the park position. There may be some disadvantage or problem with incorporating such a transmission park feature but Applicant's system of this invention eliminates those potential disadvantages or problems.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An air suspension control system is provided for a vehicle such as an ambulance, bus, semi-truck, rescue vehicle, pick-up truck, automobile, etc. The air suspension control system includes an air supply, such as an air compressor, which is configured to pneumatically communicate with a lift mechanism, such as air springs, in or on the vehicle. A controller is operatively connected to the air supply for selectively moving the lift mechanism between a ride height position to a kneeling position and vice versa. When the lift mechanism is in its ride height position in an ambulance mode, the lift mechanism may be moved to its kneeling position by activating the kneel input signal of the controller. The controller is programmed to return or recover the lift mechanism to the ride height position when the kneel signal input is deactivated at any time that the lift mechanism is in transition from its ride height position to its kneeling position.

If the lift mechanism is in its kneeling position, the lift mechanism may only be raised to its ride height position by deactivating the kneel input signal and activating the recover trigger input.

In one embodiment of the invention, the lift mechanism will only function when the vehicle transmission is in park. If the park mode is utilized, and the lift mechanism is in its kneeling position, the lift mechanism will return to its ride height position if the transmission is moved out of its park position. A means is also provided to ignore the park signal when necessary, allowing the suspension to kneel when the vehicle transmission is not in park. In another embodiment, an ignition timer is associated with the controller so that the lift mechanism will function for a period of time after the ignition of the vehicle is turned off. In that embodiment, the lift mechanism is functional to permit the lift mechanism to move from the ride height position to the kneeling position during the prescribed period of time and is functional during the prescribed period of time to return to its ride height position as the lift mechanism is in transition from its ride height position to its kneeling position.

It is therefore a principle object of the invention to provide an improved air suspension system for a vehicle such as an ambulance, semi-truck or bus.

A further object of the invention is to provide an improved air suspension control system for a vehicle which includes a lift mechanism for selectively moving the vehicle between a ride height position to a kneeling position and vice versa.

Yet another object of the invention is to provide an air suspension control system of the type described which includes a controller which is configured to return the lift mechanism thereof to its ride height position during the kneeling process by only the deactivation of the kneel input.

Still another object of the invention is to provide an air suspension control system of the type described which permits the lift mechanism to kneel only when the vehicle transmission is in park.

Yet another object of the invention is to provide an air suspension control system of the type described which includes an ignition timer which permits the lift mechanism to kneel for a pre-selected period of time after the vehicle ignition system has been turned off.

Still another object of the invention is to provide an air suspension control system which may be incorporated into existing control systems without extensive modifications thereof.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
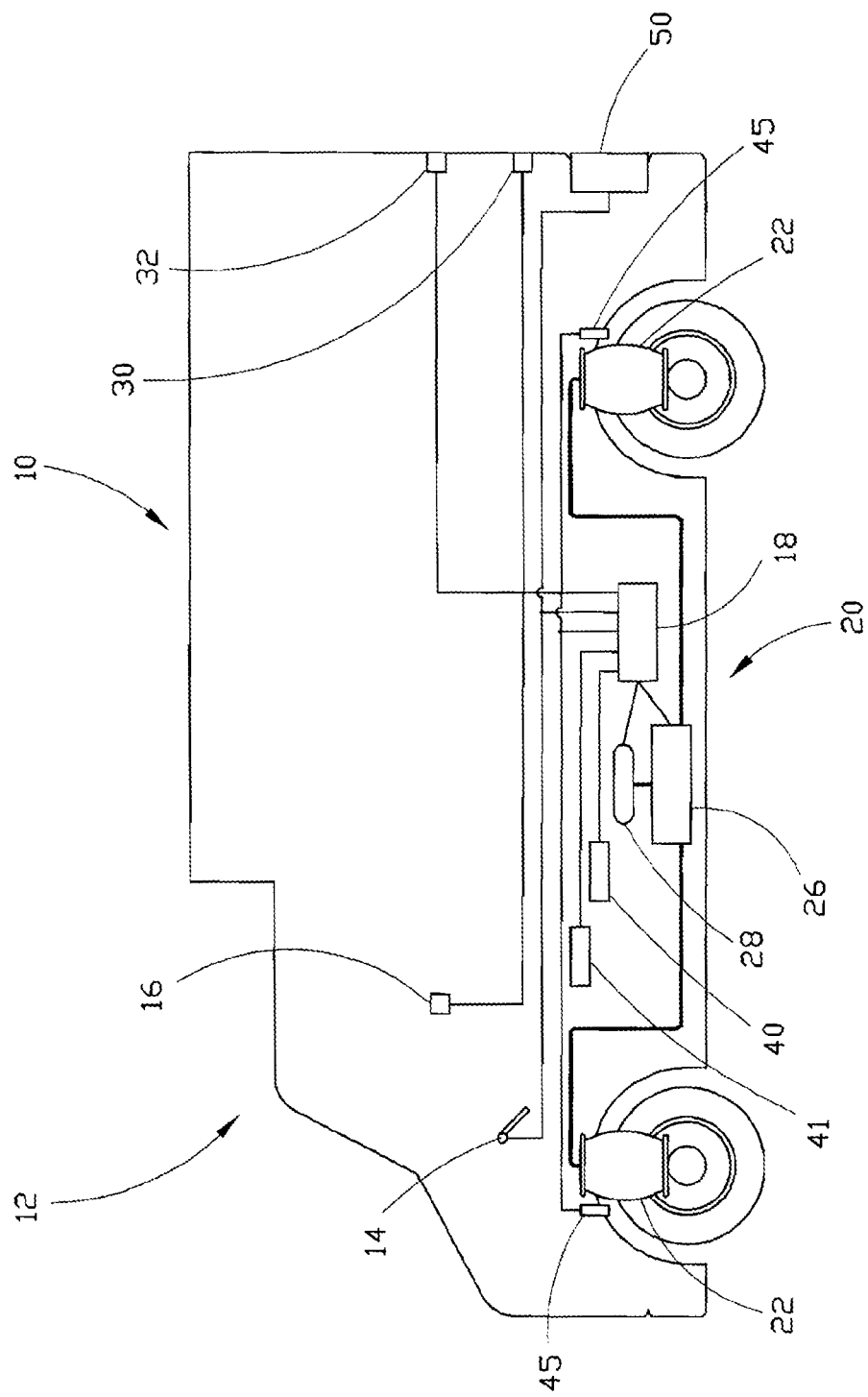
FIG. 1 is a side view of a vehicle having the control system of this invention with the vehicle being in its ride height position.
Figure 2:
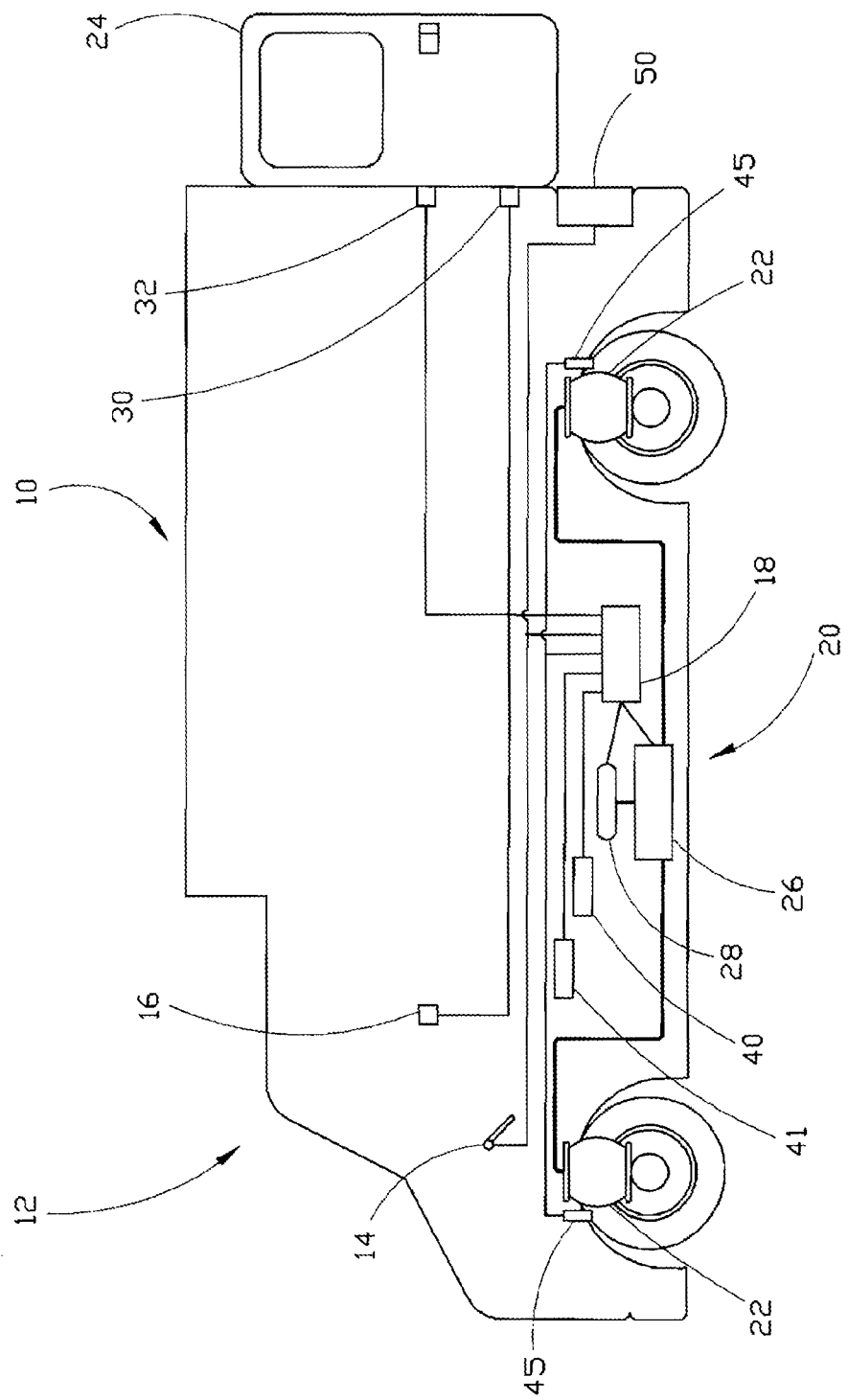
FIG. 2 is a side view of the vehicle of FIG. 1 in its kneeling position.
Figure 3A:
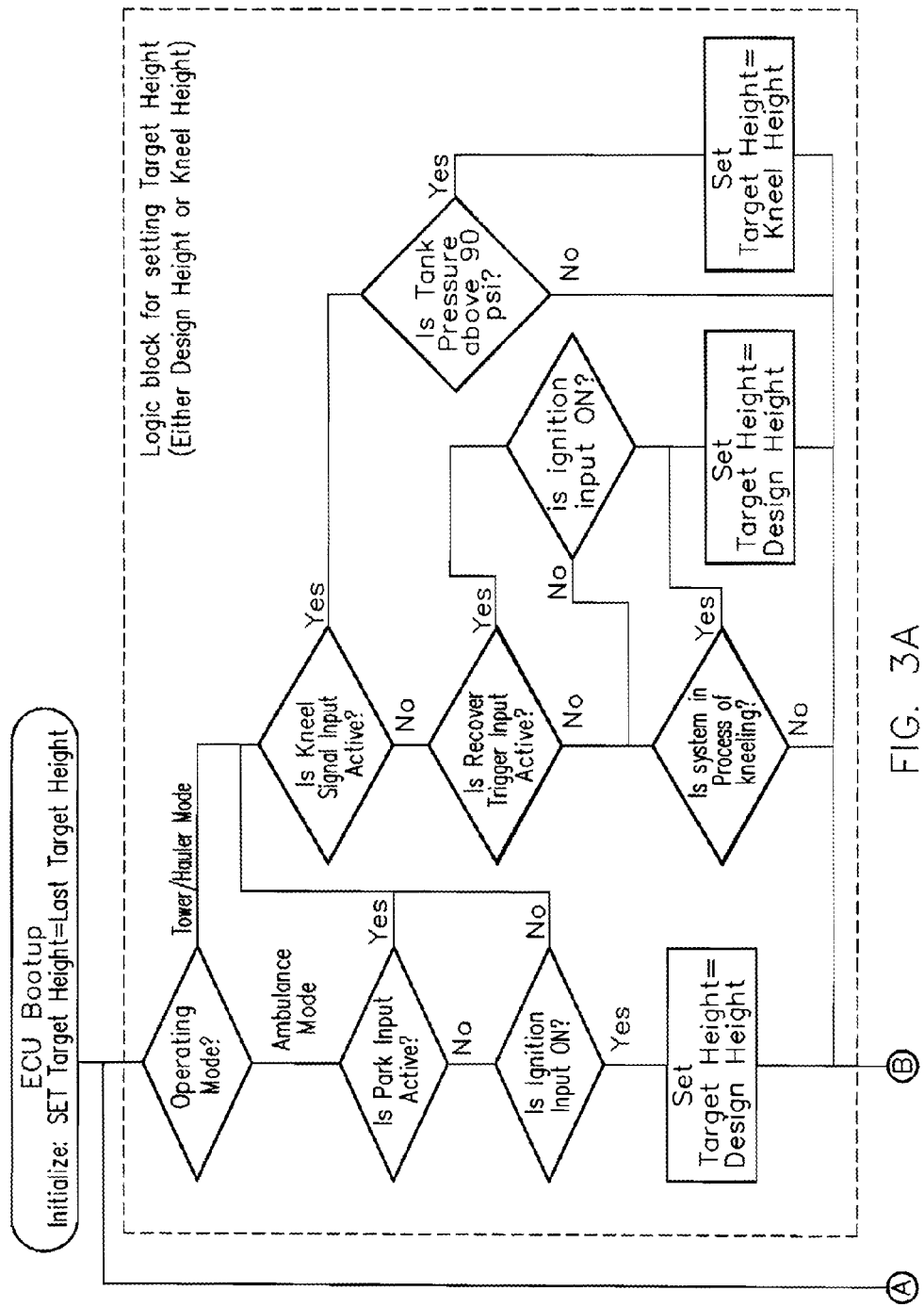
FIG. 3A is the upper half of the flow chart of this invention.
Figure 3B:
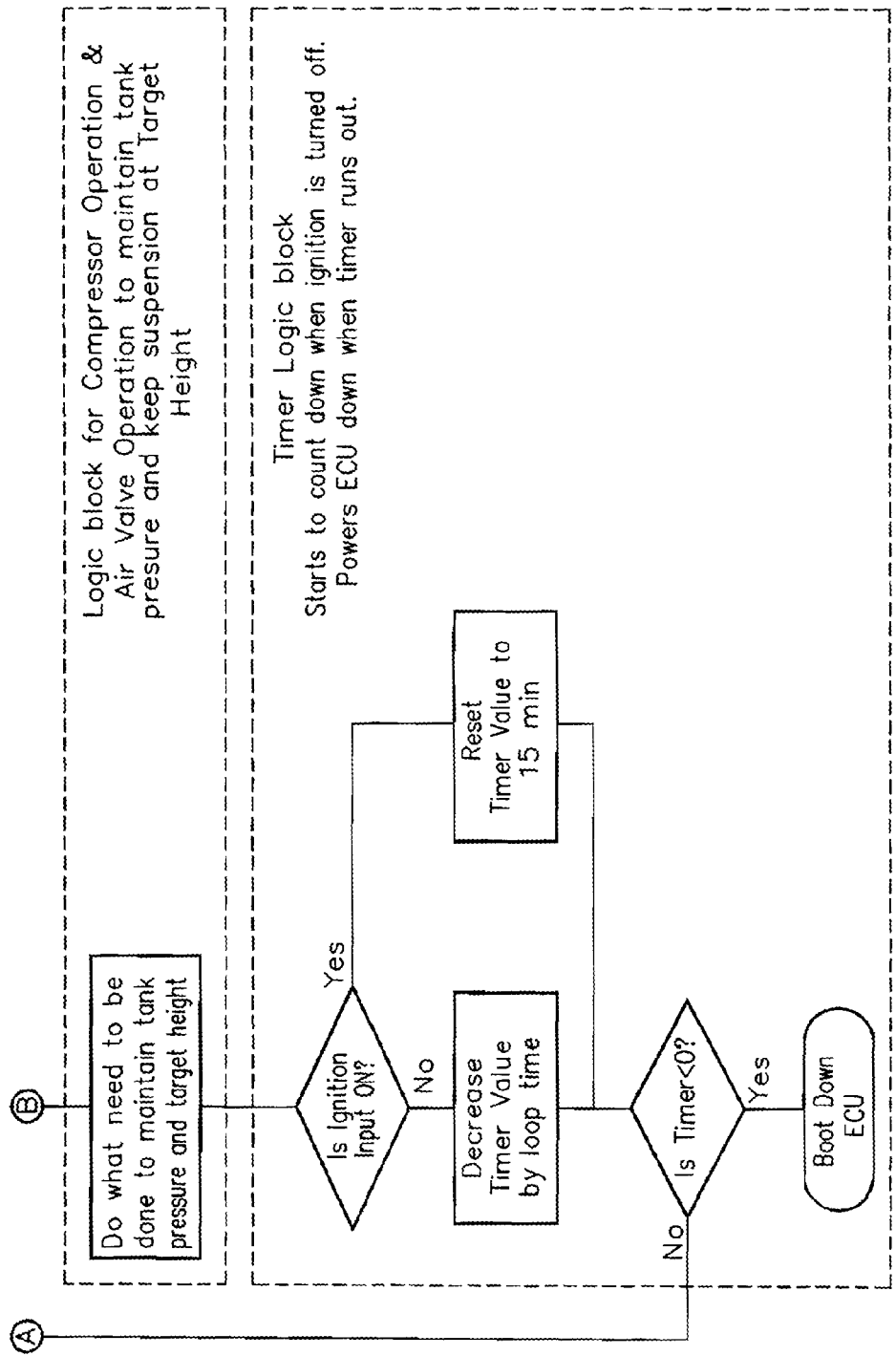
FIG. 3B is the lower half of the flow chart of this invention.

The instant invention is designed to be used with a vehicle such as an ambulance 10 as seen in FIGS. 1 and 2. The instant invention may also be used with a truck having a fifth wheel hitch structure for connection to a trailer. Further, the invention may be used with a bus.

Although the invention will be described as an air suspension system, the invention could also be a hydraulic suspension system.

In FIG. 1, the ambulance 10 has an operator's cab 12 wherein a brake pedal 14 is provided. The brake pedal is connected to a recover trigger signal input which is active when the brake pedal 14 is depressed, also energizing the rear brake lights 50. A kneel signal input switch 16 is also included in the dash or panel thereof. Ambulance 10 also includes a transmission including a park feature. Ambulance 10 includes a controller 18 which is operable to monitor and operate certain parts of the ambulance and the height of the ambulance with respect to the supporting surface. The controller 18 essentially has five input signals. Controller 18 includes an ignition signal input 40 and a transmission park signal input 41. Controller 18 also includes a kneel signal input which is comprised of three manual switches each of which can activate the kneel signal input. The three manual switches are the cab switch 16, the low side door switch 30 or the high side down switch 32. The fourth signal input signal of the controller 18 is the recover trigger signal input which is connected to the brake pedal 14 which is activated when the brake pedal 14 is depressed. The fifth input signal is a suspension height reading input 45. The controller 18 automatically adjusts the height of the vehicle by supplying air to, or exhausting air from, a lift mechanism 20. Lift mechanism 20 includes one or more air springs 22 mounted between the rear axle and the chassis of the vehicle such that they are capable of raising and lowering the rear end of the vehicle adjacent to the rear door(s) 24 of the vehicle. The lift mechanism 20 may support the vehicle in two different positions. The first position, shown in FIG. 1, is referred to as "non-kneeling", which means the lift mechanism 20 raises or maintains the vehicle at an elevated "ride-height" intended for use while the vehicle is in transit. The elevated height of FIG. 1, is intended to ensure that the lift mechanism 20 will provide smooth support for the vehicle during normal road surface variation. The elevated height is also intended to ensure that the vehicle maintains a sufficient clearance to prevent contact with the road surface or an object on the road surface. The second position, shown in FIG. 2, is referred to as "kneeling", which means that the lift mechanism 20 lowers or maintains the vehicle at a lowered height intended for use while the vehicle is stopped and occupants are interacting with the vehicle. For example, kneeling may be used to lower the ambulance so a patient may be loaded thereinto or unloaded therefrom. Kneeling may also be used to lower a bus to allow riders to enter or exit the bus. Further, kneeling may be used to lower the rearward end of a truck fifth wheel hitch to enable the truck fifth wheel hitch to be secured to a trailer.

Lift mechanism 20 includes a manifold 26 which is in fluid communication with an air supply such as an air compressor 28 through conventional connections such as pneumatic hoses. The manifold 26 defines multiple parts extending at least a portion of the way through the manifold 26. The parts generally form a supply flow path, an exhaust flow path, and a maintain flow path. The manifold 26 can include solenoids that operate valves within the flow paths to manipulate the air flow within those flow paths. When the air supply path is open, the compressor 28 and the lift mechanism 20 are in fluid communication. In the supply orientation, the air compressor 28 may be activated to supply air to the lift mechanism 20 and effectively raise the lift mechanism 20 and vehicle 10. For example, if pneumatic springs 22 are used, the compressor 28 may supply air to the pneumatic springs 22, which may raise the vehicle 10 from the kneeling position to the non-kneeling position, or may cause smaller increases in the height of the vehicle 10. It should be noted that "activating" the compressor 28 is only intended to mean that the compressor 28 is actively supplying air, regardless of the compressor motor running. For example, a compressor includes a tank that is maintained at a predetermined pressure by the compressor motor automatically be turned on when insufficient pressure is detected. In this example, "activating" the compressor 28 means simply moving air out of the tank by opening the supply flow path. Kneel signal input switch 30 is provided at the rear of the ambulance as is a kneel signal input switch 32.

The controller 18 may function in an ambulance mode and a tower/hauler mode. Assuming that the controller 18 is in the ambulance mode, the system of this invention functions as will now be described. The driver of the ambulance travels to a hospital or the like and places the transmission of the ambulance in "park". The driver then opens the rear door(s) 24, which is a kneel signal input, which causes the lift mechanism 20 to begin the kneeling process. If the driver wishes to stop the kneeling process of the lift mechanism 20 and return the lift mechanism 20 to normal ride height, the driver closes the rear door(s) 24 before the lift mechanism 20 is completely kneeled. If the lift mechanism is completely kneeled, the lift mechanism may be returned to ride height by closing the rear door(s) 24 and depressing the brake pedal 14. The lift mechanism 20 may also be returned to the ride height position by taking the transmission out of park.

As stated above, the controller 18 may also function in a tower/hauler mode to enable the rear end of a truck to be lowered enabling the truck to be hitched to a trailer or the like. The controller 18, when in the tower/hauler mode, effectively by-passes or ignores the transmission park input signal. The driver may lower the rear end of the truck by activating the switch 16 in the cab 12 which causes the lift mechanism 20 to kneel. The lift mechanism remains in the kneeling position even if the transmission is not in park. Once the hook-up process is completed, or the driver is ready to return the lift mechanism to ride height, the driver deactivates the kneel signal input by way of switch 16 and depresses the brake pedal 14.

The controller 18 is also associated with an ignition timer which may be used in both the ambulance mode and the tower/hauler mode. The timer starts counting down when the ignition of the vehicle is turned off. When the timer runs out, the air control system shuts down. While the ignition is off and before the timer runs down, the logic allows the lift mechanism to kneel. The controller 18 won't allow the lift mechanism to recover to ride height once the lift mechanism has reached the kneeling position. However, during the kneeling process, controller 18 will allow the lift mechanism to recover to ride height.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A vehicle air suspension control system, comprising:
   (a) an air supply configured to pneumatically communicate with a lift mechanism in the vehicle;
   (b) a controller operatively connected to said air supply for selectively moving said lift mechanism between a ride height position to a kneeling position and for selectively moving said lift mechanism from said kneeling position to the said ride height position;
   (c) said controller being programmed to exhaust air from said lift mechanism, when in its said ride height position, to begin lowering said lift mechanism towards said kneeling position upon activating a kneeling input signal from a switch or switches in the vehicle;
   (d) said controller also being programmed to stop the kneeling process and return the lift mechanism to its said ride height position upon only deactivation of the kneel input signal from said switch or switches at any time prior to said lift mechanism reaching its kneeling position; and
   (e) said controller also being programmed to return the lift mechanism from its kneel height to its said ride height position upon deactivation of the kneel input signal from said switches and activation of the recover trigger input from the brake pedal at any time after said lift mechanism has reached its kneeling position.

2. The vehicle air suspension control system of claim 1 wherein the vehicle includes a door and wherein a switch or switches are associated with the vehicle door so that said switch or switches activate the kneel input signal to said controller when the door of the vehicle is opened and wherein said switch or switches deactivate the kneel input signal to said controller upon the door being subsequently closed.

3. The vehicle air suspension system of claim 1 wherein the vehicle includes a transmission having a park function and wherein said controller is normally unable to move the lift mechanism from its said ride height position to its said kneeling position unless said transmission is in park.

4. The vehicle air suspension system of claim 3 further including means to by-pass the park input signal.

5. The vehicle air suspension system of claim 1 further including an ignition timer whereby said lift mechanism is functional for a selected period of time after the vehicle ignition has been turned off.

6. The vehicle air suspension system of claim 5 wherein said lift mechanism is functional to permit said lift mechanism to move from its said ride height position to its said kneeling position during said selected period of time and is functional during the said period of time to return to its said ride height position as said lift mechanism is moving from its said ride height position to its said kneeling position.

\* \* \* \* \*